INVENTORS
Frederick J. Krummel and
Oliver E. Duemler
BY
Albert J. Henderson
THEIR ATTORNEY Sept. 20, 1955    F. J. KRUMMEL ET AL    2,718,233
VALVES Filed Jan. 28, 1953    3 Sheets-Sheet 2

INVENTORS
Frederick J. Krummel and
Oliver E. Daemler.
BY
Albert J. Henderson
THEIR ATTORNEY

United States Patent Office 2,718,233
Patented Sept. 20, 1955

2,718,233
VALVES

Frederick J. Krummel, East St. Louis, Ill., and Oliver E. Duemler, Pasadena, Calif., assignors to Walworth Company, Boston, Mass., a corporation of Massachusetts Application January 28, 1953, Serial No. 333,794

9 Claims. (Cl. 137—119)

This invention relates to valves and more particularly to shuttle valves of the dual seating type.

The valve of this disclosure is particularly adapted although not limited for use with gate valves of the double disk type used in oil and gas transmission lines. Such gate valves are subject to excessive build up of fluid pressure in the bonnet area when the valve is closed. Apart from the hazardous conditions so created, the entrapped pressure renders the gate valve difficult to operate from a closed position. While pressure relief valves of the spring loaded type have been used they are subject to mechanical failure and leakage when installed for venting the bonnet area to the upstream side or to atmosphere. The installation of vent lines without valving to the upstream sides is also objectionable since it introduces single directional flow characteristic into the gate valve and thus limits the usefulness of the valve.

An object of the present invention is to prevent the entrapment of pressure in the bonnet area of a line valve.

Another object of the invention is to automatically vent the bonnet chamber of a line valve to the highest pressure side of the valve.

Another object of the invention is to permit automatic venting irrespective of reversal of flow through the line valve.

These and other objects and advantages are accomplished by providing a double seated shuttle valve which can be installed on a line gate valve with aligned fluid passages connected to the upstream and downstream sides of the line valve and a third fluid passage intersecting the aligned passages and connected to the bonnet area of the line valve. The valve seats of the shuttle valve have guide means for the valve member and are movable in the shuttle valve body. A pair of stop members is carried on the valve body and project into the aligned passages for engagement with the valve seats. The valve member is slidable on the guide means between the valve seats while they remain in engagement with the stop members.

The valve member has opposite ends of conical form which cooperate with conical seating surfaces on the valve seats. The valve seats are movable out of engagement with the stop members and into engagement with both ends of the valve member when fluid pressure within the aligned fluid passages exceeds the fluid pressure in the third fluid passage. Since the shuttle valve is double-seated it permits equalization of the pressure within the line gate valve with the inlet thereto having the highest pressure. Should the pressure be sufficiently increased at the opposite inlet of the line valve, the pressure within the shuttle valve automatically equalizes with the pressure at that inlet. Moreover, under certain conditions, the movable valve seats of the shuttle valve member become seated against the opposite ends of the shuttle valve member to prevent escape of pressures from each end of the shuttle valve through the third fluid passage.

Figure 1:
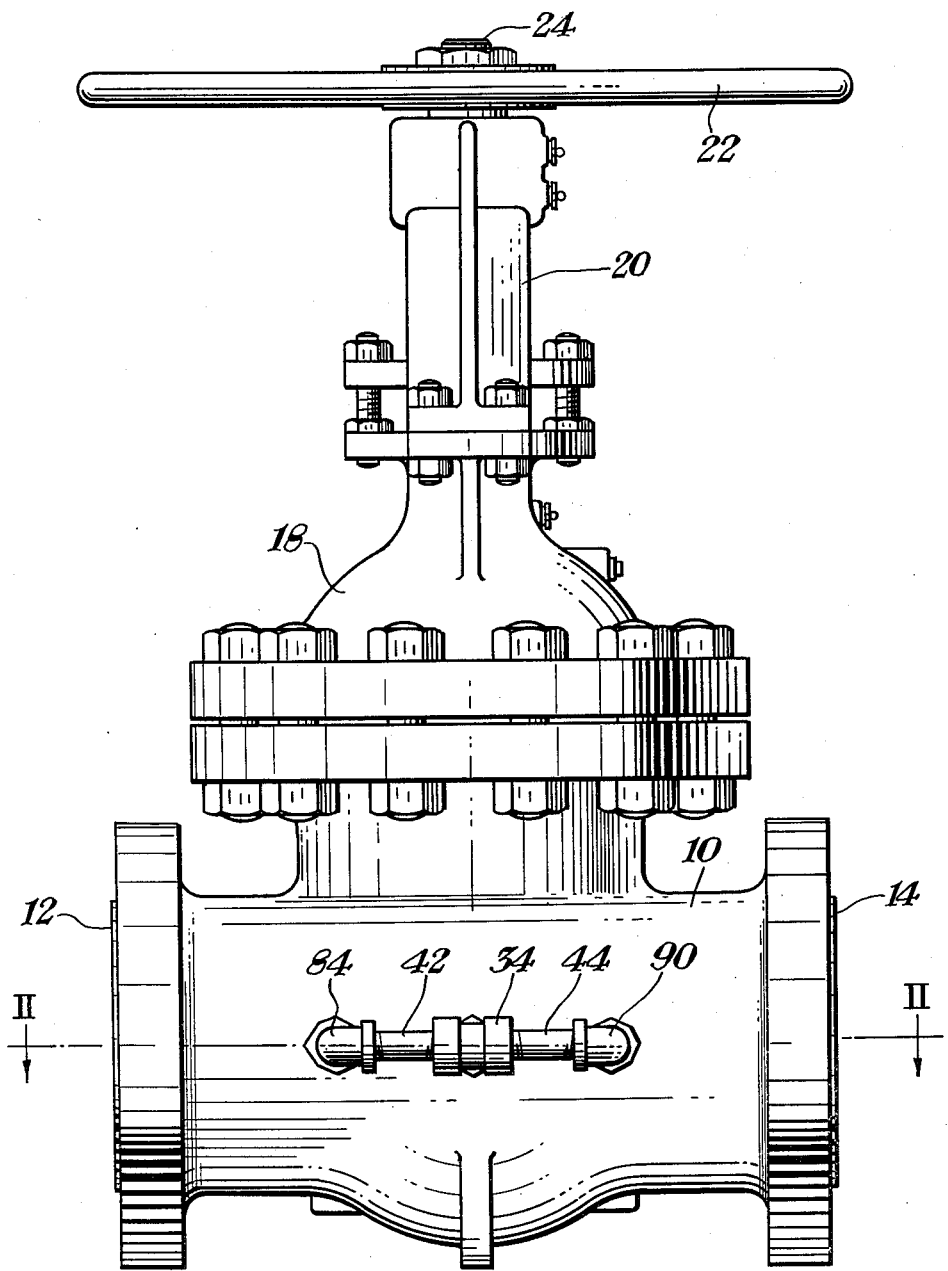
Fig. 1 is a front elevation of a conventional line gate valve having the invention applied thereto.

Referring more particularly to the drawings, the conventional gate valve comprises a body 10 having a fluid inlet 12 and a fluid outlet 14 at opposite ends thereof and intersected by a valve chamber 16. The valve chamber 16 communicates with and forms part of the bonnet area of the valve as is customary in such constructions. The bonnet area proper is defined by a bonnet member 18 which is secured to the body member 10 and is surmounted by the usual yoke 20 and hand wheel 22.

The valve is provided with a threaded stem 24 which is operable in the yoke 20 and carries the hand wheel 22 which is rotatable thereon. That portion of the body 10 defining the valve chamber 16 is provided with oppositely disposed seat rings 26, 28 with which a pair of valve disks 30, 32 are adapted to coact respectively. It will be apparent therefore that the conventional valve thus described and shown constitutes an outside screw and yoke type construction having the double disks 30, 32 which are movable apart by operation of the hand wheel 22 into seating engagement with the seat rings 26, 28 for closing the passages 12, 14 through the valve.

While a valve of the outside screw and yoke construction has been shown and described herein, it will be apparent hereinafter that the invention is not limited thereto, but other conventional types of line valves could be substituted, including valves of the non-rising stem type. It is well-known that gate valves are frequently difficult to operate in the closed condition when fluid pressure entrapped within the valve passages exceeds the pressure in either one or both fluid passageways. An automatic device for overcoming such objection should function regardless of the direction of flow through the main line valve.

Figure 3:
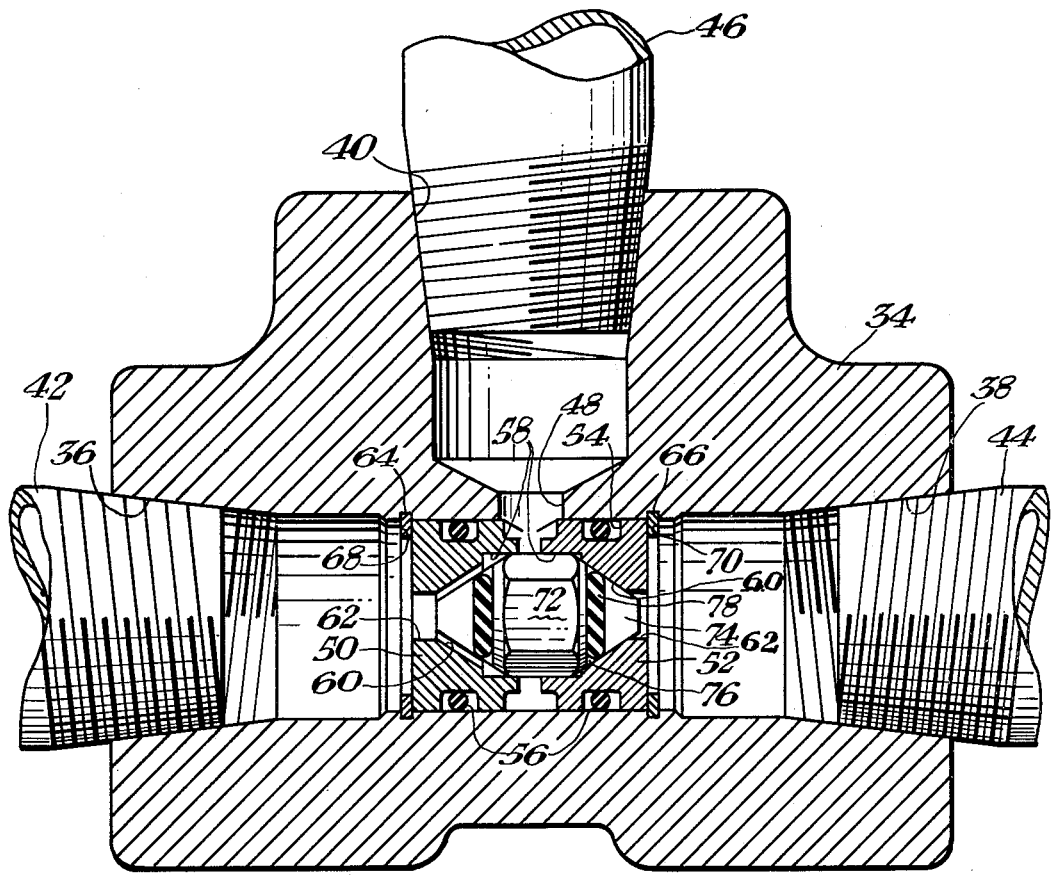
Fig. 3 is an enlarged sectional view of the shuttle valve shown in Figs. 1 and 2.

To this end, this invention comprises a shuttle valve shown more clearly in Fig. 3 as having a valve body 34 provided with a pair of axially aligned fluid passages 36, 38 and a third fluid passage 40 extending normal to the passages 36, 38 and intersecting them on one side thereof. Each of the passages 36—40 is threaded at its outer end for the reception of suitable conduits in the form of pipe nipples 42, 44 and 46 respectively. The passage 40 terminates at its junction with the passages 42, 44 in a reduced opening 48 for a purpose which will be apparent hereinafter.

A pair of annular valve seats 50, 52 are positioned in the aligned passages 36, 38 respectively on either side of the third passage 40. The valve seats 50, 52 are slidable in the passages 36, 38 and each is provided with an annular recess 54 midway between its ends for the reception of a sealing ring 56 of elastic material, such as rubber. Each of the annular valve seats 50, 52 has an inner wall portion 58 of substantially cylindrical form and juxtaposed with the cylindrical inner wall portion 58 formed on the other valve seat. The cylindrical inner wall portions 58 together form guide means which will be more fully described hereinafter.

Extending from each of the inner wall portions 58 is a conical seating surface 60 which converges into a fluid passage 62 of reduced area. Slidable movement of the valve seats 50, 52 is limited by the provision of a pair of annular stop members 64, 66 in the form of split rings projecting from annular recesses 68, 70 respectively formed in the walls of the passages 36, 38. The stop members 64, 66 project into the passages 36, 38 respectively and are adapted to engage the end faces of the valve seats 50, 52 respectively. In such position of the valve seats 50, 52 the inner faces thereof are spaced apart to provide access for fluid between the passage 40 and the passage 62 in the valve seats 50, 52, by way of reduced opening 48.

A shuttle valve member 72 is positioned within the valve seats 50, 52 for cooperation with the conical valve seats 60 formed therein. The median portion of the valve member 72 has a noncircular contour, specifically in this embodiment polygonal, forming a guide means in slidable engagement with the guide means formed by the cylindrical inner walls 58 of the valve seats 50, 52. The noncircular contour of the median portion of the valve member 72 provides access for fluid entering or leaving between the interfaces of the valve seats 50, 52 to or from the interior thereof as will be apparent. The opposite end portions 74 of the valve member 72 are conical in form for cooperation with the conical seating surfaces 60 formed on the valve seats 50, 52. The opposite conical ends 74 are provided with annular recesses 76 intermediate their ends for the reception of sealing rings 78 of elastic material, such as rubber.

While the valve seats 50, 52 remain in engagement with the stop members 64, 66 respectively, then the valve member 72 remains free to move therebetween for engagement of the conical ends 74 alternatively with the conical seating surfaces 60. The valve seats 50, 52 are, however, movable out of engagement with the stop members 64, 66 under certain pressure conditions to bring the conical seating surfaces 60 into engagement with both conical ends 74 of the valve member 72 simultaneously. This, and other functions of the shuttle valve construction are best described in connection with a typical installation of such shuttle valve on the line gate valve shown in Figs. 1 and 2.

Figure 2:
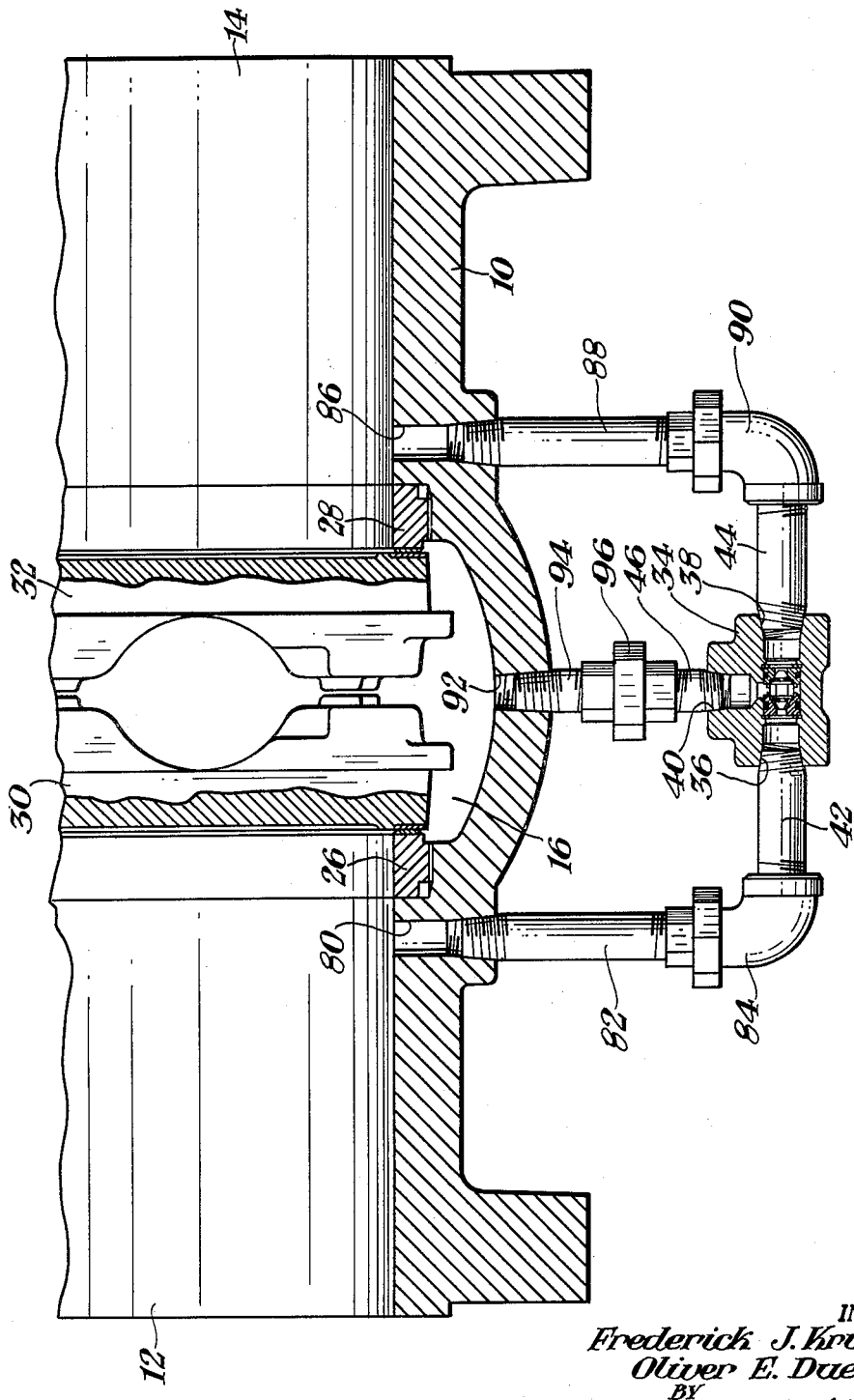
Fig. 2 is a partial cross-section taken on the line II—II of Fig. 1.

As shown in Figs. 1 and 2 the inlet passage 12 of the line gate valve is provided with a lateral opening 80 having its outer portion threaded for engagement with the threaded end of a conduit or pipe nipple 82. A suitable union elbow connection 84 is provided between the nipples 82 and 42 on the shuttle valve member 34. In a similar manner the outlet passage of the line gate valve is provided with an opening 86 and nipple 88 which is connected to the nipple 44 of the shuttle valve member 34 by a union elbow 90.

The bonnet area of the gate valve body 10 including the valve chamber 16 is vented through the third passage 40 of the shuttle valve member 34 by an opening 92 in the wall of the body 10 and having a threaded conduit or pipe nipple 94 connected thereto and by a union 96 to the nipple 46.

Upon the line gate valve being closed with the valve members 30, 32 in engagement with the seat rings 26, 28 respectively, there will be a differential in fluid pressure established between the inlet 12 and the outlet 14. The line pressure in the inlet passage 12 is transmitted through the lateral opening 80, nipple 82, elbow 84, and nipple 42 to the passage 36 to operate the shuttle valve member 72 into engagement with the conical seat 60 of the valve seat 52. This position is shown in the drawings.

However, under such conditions there is a pressure differential established between the fluid in the inlet 12 and the fluid entrapped in the bonnet area including the valve chamber 16. In line valves of the type illustrated and described herein, it is well-known that the entrapped pressure is higher than the inlet pressure and this would ordinarily create the hazardous conditions described. In this invention, the entrapped fluid has egress through the opening 92, pipe nipple 94, union 96 and pipe nipple 46 to the passage 40 of the shuttle valve body 34. Thus, such fluid passes over the valve member 72 to the valve seat 50 and through the passage 62 therein for exit through the passage 36. This accomplishes the desired purpose of venting the bonnet area 16 of the line gate valve to the upstream side of this valve by way of the nipple 42, union elbow 84 and nipple 82 to the opening 80.

Upon reversal of flow through the main line gate valve so that the passage 14 becomes the upstream end, then the shuttle valve member 72 will be moved to close the passage 36 by engagement with the conical seat 60 of the valve seat 50. Thus, the bonnet area 16 of the line gate valve will be automatically vented through the nipple 44, union elbow 90, nipple 88 and opening 86 to the upstream passage 14 of the line gate valve.

Occasionally, gate valves are installed for handling unlike materials at either end and leakages of either or both to the other are undesirable. The valves used for such service must have a tight shut-off on both seating surfaces and are said to be in sectionalizing service. An open vent between the seat rings 26, 28 in the bonnet area including the valve chamber 16 indicates whether a positive shut-off of fluid is obtained when the valve disks 30, 32 are in closed position. The vent also permits detection and drainage of any leakage fluid from this bonnet area. A pipe connection and vent valve (not shown) may be utilized at the opening 92 for detecting and draining away such leakage fluid. When this vent valve (not shown) is opened there is positive indication that no leakage occurs between seat 26 and disc 30 or between seat 28 and disc 32 thus preventing contamination of dissimilar fluids in valve passages 12 and 14. Under such condition of open vent valve, leakage of fluids from passages 12 or 14 into valve chamber 16 is prevented by higher pressures in passages 12 and 14 causing seat members 50 and 52 to move into intimate contact with valve member 72 preventing flow of fluid from either passage 12 or 14 into valve chamber 16. If the vent valve should accidentally be closed a hazardous build-up of pressure in valve chamber 16 would be prevented in the manner previously described because closing of the vent valve would establish a set of operating conditions which would be present if the vent valve was not included.

It will be apparent that these and many other changes may be made in the details of construction and arrangement of parts without departing from the scope of the invention as defined in the appended claims.

We claim:

1. A shuttle valve comprising a valve body having a pair of aligned fluid passages and a third fluid passage intersecting said pair, a pair of oppositely disposed hollow valve seats positioned in said body intermediate said aligned passages and communicating therewith, said valve seats being normally spaced one from the other providing communication therebetween with said third passage, said valve seats having inner wall portions forming guide means juxtaposed with each other, and a shuttle valve member positioned within said valve seats for reciprocable movement relative thereto and adapted for alternative engagement therewith, said valve member having guide means thereon in slidable engagement with said guide means on said inner wall portions, one of said guide means having a substantially circular contour and the other said guide means having a non-circular contour to provide passage for fluid between said aligned passages and said third passage.

2. A shuttle valve as claimed in claim 1 wherein said inner wall portions form the median portion of said oppositely disposed valve seats and terminate at opposite ends thereof in conical seating surfaces, said valve member having its said guide means forming the median portion thereof and terminating at opposite ends in conical surfaces cooperable with said seating surfaces.

3. A shuttle valve as claimed in claim 2 wherein yieldable sealing rings are operable between said conical surfaces of said valve member and valve seats for sealing against leakage between said engaged surfaces.

4. A shuttle valve comprising a valve body having a pair of aligned fluid passages and a third fluid passage intersecting said pair, a pair of oppositely disposed hollow valve seats positioned intermediate said aligned passages and communicating therewith, said valve seats being movable and spaced one from the other providing communication therebetween and with said third passage, a pair of hollow stop members carried on said body and projecting into said aligned passages for engagement with said valve seats respectively, and a shuttle valve member positioned within said valve seats and slidable therebetween while said valve seats remain in engagement with said stop members, said valve seats being movable out of engagement with said stop members and into engagement with both ends of said valve member when fluid pressure within said aligned passages exceeds the fluid pressure in said third passage.

5. A shuttle valve as claimed in claim 4 wherein yieldable sealing rings are operable between said valve seats and the adjacent walls of said aligned passages, and yieldable sealing rings operable between said shuttle valve member and said valve seats.

6. A shuttle valve comprising a valve body having a pair of aligned fluid passages and a third fluid passage intersecting said pair, a pair of oppositely disposed hollow valve seats positioned intermediate said aligned passages and communicating therewith, said valve seats being movable and spaced one from the other providing communication therebetween and with said third passage, a pair of hollow stop members carried on said body and projecting into said aligned passages for engagement with said valve seats respectively, said valve seats having inner wall portions forming guide means juxtaposed with each other and terminating in oppositely disposed seating surfaces, and a shuttle valve member positioned within said valve seats and slidable on said guide means into alternative engagement with said seating surfaces while said valve seats remain in engagement with said stop members, said valve seats being movable out of engagement with said stop members to bring said seating surfaces into engagement with both ends of said valve member when fluid pressure within said aligned passages exceeds the fluid pressure in said third passage.

7. A shuttle valve as claimed in claim 6 wherein said valve member is provided with guide means for slidable engagement with said guide means on said valve seats, one of said guide means having a substantially circular contour and the other said guide means having a non-circular contour to provide passage for fluid between said aligned passages and said third passage.

8. A shuttle valve comprising a valve body having a pair of axially aligned fluid passages and a third fluid passage extending normal thereto and intersecting said pair on one side thereof, a pair of annular valve seats positioned in said aligned passages respectively on either side of said third passage, said valve seats being movable and spaced one from the other providing communication therebetween and with said third passage, a pair of annular stop members carried on said body and projecting into said aligned passages for operative engagement with the outer end faces of said valve seats respectively, said valve seats each having substantially cylindrical inner walls juxtaposed with each other forming guide means and terminating in oppositely disposed conical seating surfaces, and a shuttle valve member positioned within said valve seats and slidable on said guide means, said valve member having opposite ends forming conical surfaces cooperable with said seating surfaces alternatively while said valve seats remain in engagement with said stop members, said valve seats being movable out of engagement with said stop members to bring said seating surfaces into engagement with said surfaces on said valve member when fluid pressure within said aligned passages exceeds the fluid pressure in said third passage.

9. A shuttle valve as claim in claim 8 wherein a pair of elastic sealing rings are carried on said valve seats respectively for sealing engagement with the walls of said aligned passages, and a pair of elastic sealing rings are carried on said conical surfaces of said valve member for sealing engagement with said seating surfaces of said valve seats respectively.

References Cited in the file of this patent
UNITED STATES PATENTS

| | | |
|---|---|---|
| 1,640,408 | House | Aug. 30, 1927 |
| 1,686,310 | Beebe | Oct. 2, 1928 |
| 1,897,432 | Klotzman | Feb. 14, 1933 |
| 2,613,908 | Palen | Oct. 14, 1952 |
| 2,626,655 | Trautman | Jan. 27, 1953 |
| 2,670,752 | Laurent | Mar. 2, 1954 |